United States Patent
Kawamura

(10) Patent No.: US 12,283,139 B2
(45) Date of Patent: Apr. 22, 2025

(54) DRIVING DIAGNOSTIC MAP CREATION DEVICE, DRIVING DIAGNOSTIC MAP CREATION SYSTEM, AND DRIVING DIAGNOSTIC MAP CREATION METHOD

(71) Applicant: TOYOTA JIDOSHA KABUSHIKI KAISHA, Aichi-ken (JP)

(72) Inventor: Yusuke Kawamura, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 147 days.

(21) Appl. No.: 18/295,847

(22) Filed: Apr. 5, 2023

(65) Prior Publication Data
US 2023/0401906 A1     Dec. 14, 2023

(30) Foreign Application Priority Data
Jun. 14, 2022   (JP) ................. 2022-096030

(51) Int. Cl.
*G07C 5/02*   (2006.01)
(52) U.S. Cl.
CPC .................. *G07C 5/02* (2013.01)

(58) Field of Classification Search
CPC ...................................... G07C 5/02
See application file for complete search history.

(56) References Cited

U.S. PATENT DOCUMENTS

| | | | |
|---|---|---|---|
| 8,209,120 B2 * | 6/2012 | Breed | G08G 1/161 340/539.2 |
| 10,794,711 B2 * | 10/2020 | Wheeler | G06V 20/56 |
| 2010/0250045 A1 | 9/2010 | Miura et al. | |
| 2019/0344750 A1 * | 11/2019 | Takata | B60N 2/0278 |

FOREIGN PATENT DOCUMENTS

JP       2010237829 A     10/2010

* cited by examiner

*Primary Examiner* — Gertrude Arthur Jeanglaude
(74) *Attorney, Agent, or Firm* — HAUPTMAN HAM, LLP

(57) ABSTRACT

A map creation unit that creates a driving diagnostic map used by the driving diagnostic unit for driving diagnosis of the vehicle based on a detection value of vehicle information acquired by a sensor provided in the vehicle, and a map management unit that discards the driving diagnostic map when a discarding condition is satisfied with respect to the driving diagnostic map and the latest detection value created by the map creation unit based on the detection value acquired before the latest detection value which is the latest detection value.

4 Claims, 10 Drawing Sheets

FIG. 9

| VEHICLE SPEED V2 | STEERING ANGLE ACCELERATION STa2 | SCORE |
|---|---|---|
| V2 < A | STa2 < ×1 | 10 POINTS |
| V2 < A | STa2 ≥ ×1 | ONE POINT |
| A ≤ V2 < B | STa2 < ×2 | 10 POINTS |
| A ≤ V2 < B | STa2 ≥ ×2 | ONE POINT |
| V2 ≥ B | STa2 < ×3 | 10 POINTS |
| V2 ≥ B | STa2 ≥ ×3 | ONE POINT |

65

DRIVING DIAGNOSTIC MAP CREATION DEVICE, DRIVING DIAGNOSTIC MAP CREATION SYSTEM, AND DRIVING DIAGNOSTIC MAP CREATION METHOD

CROSS-REFERENCE TO RELATED APPLICATION

This application claims priority to Japanese Patent Application No. 2022-096030 filed on Jun. 14, 2022, incorporated herein by reference in its entirety.

BACKGROUND

1. Technical Field

The present disclosure relates to a driving diagnostic map creation device, a driving diagnostic map creation system, and a driving diagnostic map creation method.

2. Description of Related Art

Japanese Unexamined Patent Application Publication No. 2010-237829 (JP 2010-237829 A) discloses a disclosure in which, when an accident frequent point is included in a diagnosis target area in front of a vehicle in a traveling direction, a determination criterion of driving diagnosis is changed based on an accident factor of the accident frequent point. In JP 2010-237829 A, based on the changed determination criterion, the driving diagnosis at the accident frequent point is executed.

SUMMARY

In JP 2010-237829 A, a change in vehicle characteristics is not taken into consideration. In this respect, there is room for improvement in JP 2010-237829 A.

In view of the above, an object of the present disclosure is to obtain a driving diagnostic map creation device, a driving diagnostic map creation system, a driving diagnostic map creation method, and a program capable of executing accurate driving diagnosis, even when the vehicle characteristics are greatly changed.

A driving diagnostic map creation device according to at least one embodiment of the instant application includes:
- a map creation unit that creates a driving diagnostic map used for driving diagnosis of a vehicle by a driving diagnostic unit based on a detection value of vehicle information acquired by a sensor provided in the vehicle; and
- a map management unit that discards the driving diagnostic map when a discarding condition is satisfied for a latest detection value that is the detection value acquired most recently and the driving diagnostic map created by the map creation unit based on the detection value acquired before the latest detection value.

In the driving diagnostic map creation device according to at least one embodiment of the instant application, the driving diagnostic map is discarded when the discarding condition is satisfied for the driving diagnostic map due to a large change in vehicle characteristics caused by a collision or the like of the vehicle. Therefore, after the vehicle characteristics are greatly changed, there is a small possibility that inaccurate driving diagnosis will continue to be executed due to continuous use of the driving diagnostic map for which the discarding condition is satisfied by the driving diagnostic unit. Therefore, even when the vehicle characteristics are greatly changed, the driving diagnostic map creation device can execute accurate driving diagnosis.

In the driving diagnostic map creation device according to at least one embodiment of the instant application, when a switching condition that is satisfied when a difference between the driving diagnostic map and the latest detection value becomes equal to or larger than a predetermined amount is satisfied for the driving diagnostic map and the latest detection value, the map creation unit creates, based on the latest detection value for which the switching condition is satisfied, a pending map that is able to be used by the driving diagnostic unit as a new driving diagnostic map when a predetermined learning completion requirement is satisfied.

The pending map according to at least one embodiment of the instant application is created by the map creation unit based on the latest detection value for which the switching condition is satisfied. Therefore, there is a high possibility that the pending map accurately represents the vehicle characteristics when the latest detection value for which the switching condition is satisfied is detected. Therefore, in a case where the driving diagnostic unit uses the pending map as the driving diagnostic map when the learning completion requirement is satisfied, there is a high possibility that the accurate driving diagnosis is executed.

In the driving diagnostic map creation device according to at least one embodiment of the instant application, the discarding condition is satisfied when the pending map satisfies the learning completion requirement.

In the disclosure according to at least one embodiment of the instant application, the discarding condition is satisfied when the pending map is able to be used as the driving diagnostic map. Therefore, when the old driving diagnostic map is discarded, the driving diagnosis is executed based on a new driving diagnostic map.

In the driving diagnostic map creation device according to at least one embodiment of the instant application, the driving diagnostic unit executes driving diagnosis using the existing driving diagnostic map until the pending map satisfies the learning completion requirement.

In the disclosure according to at least one embodiment of the instant application, the driving diagnostic unit executes the driving diagnosis using the existing driving diagnostic map until the pending map satisfies the learning completion requirement. Therefore, the driving diagnostic unit can execute the driving diagnosis of the vehicle until a new driving diagnostic map based on the pending map is created.

A driving diagnostic map creation system according to at least one embodiment of the instant application includes:
- a vehicle including a sensor that is able to detect vehicle information;
- a map creation unit that creates a driving diagnostic map used for driving diagnosis of the vehicle by a driving diagnostic unit based on a detection value of the vehicle information acquired by the sensor; and
- a map management unit that discards the driving diagnostic map when a discarding condition is satisfied for a latest detection value that is the detection value acquired most recently and the driving diagnostic map created by the map creation unit based on the detection value acquired before the latest detection value.

A driving diagnostic map creation method according to at least one embodiment of the instant application includes:
- a step of creating a driving diagnostic map used for driving diagnosis of a vehicle by a driving diagnostic unit based on a detection value of vehicle information acquired by a sensor provided in the vehicle; and a step of discarding the driving diagnostic map when a discarding condition is satisfied for a latest detection value that is the detection value acquired most recently and the driving diagnostic map created based on the detection value acquired before the latest detection value.

A storage medium according to at least one embodiment of the instant application stores a program. The program causes a computer to execute a process of creating a driving diagnostic map used for driving diagnosis of a vehicle by a driving diagnostic unit based on a detection value of vehicle information acquired by a sensor provided in the vehicle; and a process of discarding the driving diagnostic map when a discarding condition is satisfied for a latest detection value that is the detection value acquired most recently and the driving diagnostic map created based on the detection value acquired before the latest detection value.

As described above, the driving diagnostic map creation device, the driving diagnostic map creation system, and the driving diagnostic map creation method according to the present disclosure have an excellent effect that it is possible to execute the accurate driving diagnosis even when the vehicle characteristics are greatly changed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9 is a diagram illustrating a steering diagnostic map recorded in an external server;

DETAILED DESCRIPTION OF EMBODIMENTS

Figure 1:
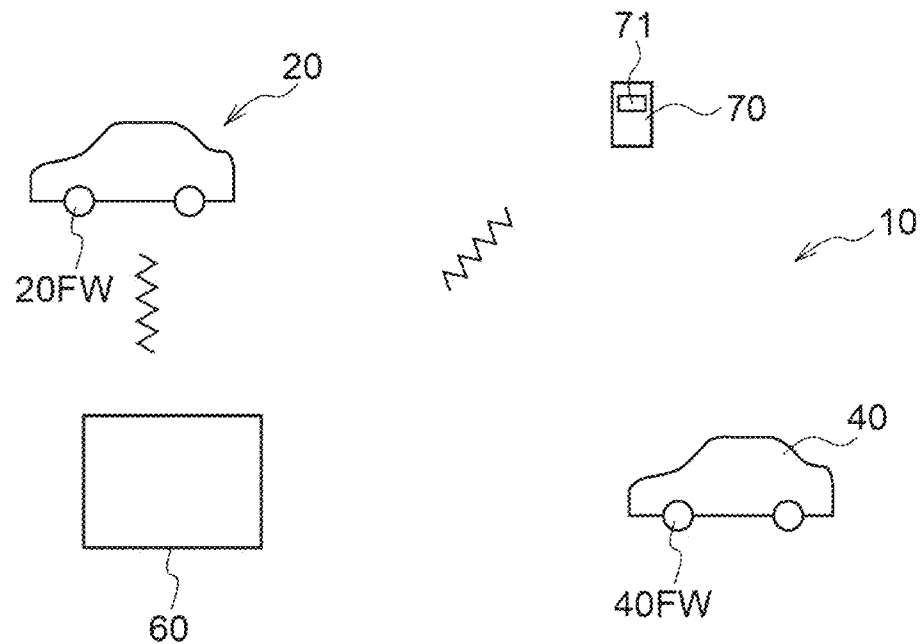
FIG. 1 is a schematic diagram illustrating a driving diagnostic map creation system according to an embodiment.

Hereinafter, embodiments of the driving diagnostic map creation system 10 (hereinafter referred to as system 10), the driving diagnostic map creation device, the driving diagnostic map creation method, and the program according to the present disclosure will be described with reference to FIGS. 1 to 13. As illustrated in FIG. 1, the system 10 includes a diagnosis target vehicle 20, a reference vehicle 40, an external server (driving diagnostic map creation device) (computer) 60, and a mobile terminal 70.

The system 10 includes a plurality of diagnosis target vehicles 20. For the sake of convenience, only one diagnosis target vehicle 20 is shown in FIG. 1. The diagnosis target vehicle 20 can perform data communication with the external server 60 via a network. The network includes a communication network of a telecommunications carrier and the Internet network.

Figure 2:
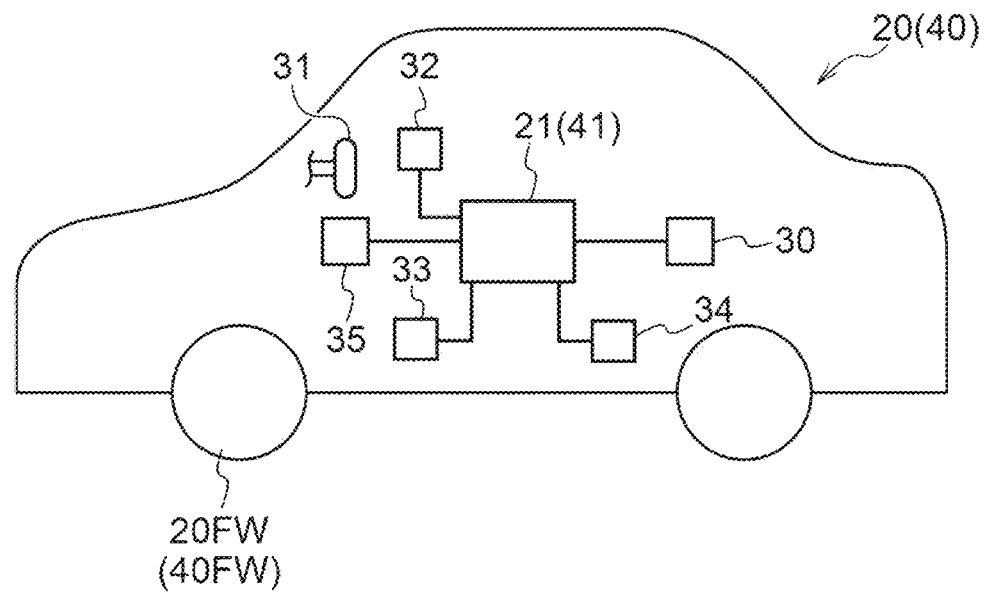
FIG. 2 is a schematic diagram illustrating a vehicle to be diagnosed and a reference vehicle of the driving diagnostic map creation system according to the embodiment.

As shown in FIG. 2, a diagnosis target vehicle 20 capable of receiving a diagnosis by the system 10 includes four wheels, Electronic Control Unit (ECU) 21, a vehicle speed sensor 30, a steering wheel 31, a steering angle sensor 32, a GPS receiver 33, a yaw rate sensor 34, and an ignition switch 35. A vehicle identification (ID) is assigned to each diagnosis target vehicle 20. Two front wheels 20FW are steered wheels. Thus, when the steering angle of the steering wheel 31 changes, the steered angles of the right and left steered wheels 20FW change. The vehicle speed sensor 30, the steering angle sensor 32, GPS receiver 33, the yaw rate sensor 34, and the ignition switch 35 are connected to ECU 21. When the ignition switch 35 is in the OFF state, the drive source of the diagnosis target vehicle 20 is inoperable, and when the ignition switch 35 is in the ON state, the drive source is operable. The drive source includes, for example, at least one of an engine and an electric motor. Therefore, the "ignition switch 35" in the present specification includes an ignition switch operated by a key and other switches. The other switches include, for example, a push-type start button.

When the ignition switch 35 is in the on-state, the vehicle speed sensor 30 acquires the vehicle speed (vehicle information) V1 of the diagnosis target vehicle 20 and transmits the acquired vehicle speed V1 to ECU 21 every time a predetermined time elapses. When the ignition switch 35 is in the on-state, every time a predetermined time elapses, the steering angle sensor 32 acquires a steering angle (vehicle information) ST1 that is a rotational angle of the steering wheel 31, and transmits the acquired steering angle ST1 to ECU 21. When the ignition switch 35 is in the ON state, the GPS receiver 33 receives the GPS signal transmitted from a GPS satellite every time a predetermined time elapses. That is, the GPS receiver 33 acquires information related to the position where the diagnosis target vehicle 20 is traveling (hereinafter referred to as "position information"). When the ignition switch 35 is in the on-state, each time a predetermined time elapses, the yaw rate sensor 34 acquires yaw rate (vehicle information) YR1 of the diagnosis target vehicle 20 and transmits the acquired yaw rate YR1 to ECU 21. The detected values of the vehicle speed sensor 30, the steering angle sensor 32, and the yaw rate sensor 34 transmitted to ECU 21 are recorded in the storage 25, which will be described later, while being associated with ID information, the position information, and the time information of the diagnosis target vehicle 20.

Figure 3:
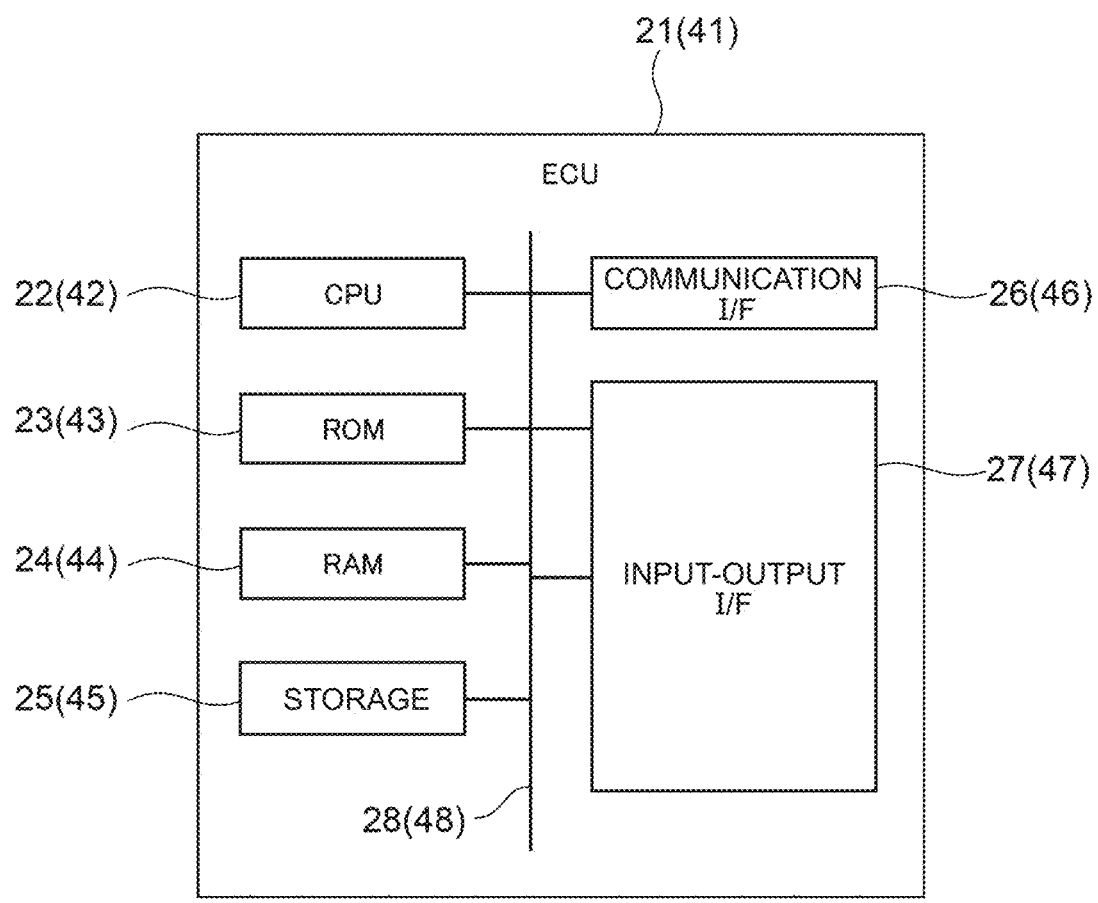
FIG. 3 is a control diagram of an ECU of a vehicle to be diagnosed and a reference vehicle.

As illustrated in FIG. 3, ECU 21 includes a Central Processing Unit (CPU: processor) 22, a Read Only Memory (ROM) 23, Random Access Memory (RAM) 24, a storage 25, a communication Inter Face (I/F) 26, and an input-output I/F 27. CPU 22, ROM 23, RAM 24, the storage 25, the communication I/F 26, and the input-output I/F 27 are communicably connected to each other via a bus 28. ECU 21 can acquire date and time information from a timer (not shown).

CPU 22 is a central processing unit that executes various programs and controls each unit. That is, CPU 22 reads the program from ROM 23 or the storage 25, and executes the program using RAM 24 as a working area. CPU 22 performs control of respective components and various arithmetic processes (information processing) in accordance with programs recorded in ROM 23 or the storage 25.

ROM 23 stores various programs and various data. RAM 24 temporarily stores a program/data as a working area. The storage 25 is constituted by a storage device such as a Hard Disk Drive (HDD) or a Solid State Drive (SSD), and stores various programs and various data. The communication I/F 26 is an interface capable of communicating with a device located outside the diagnosis target vehicle 20. For example, the communication I/F 26 can wirelessly communicate with the external servers 60. As the communication I/F 26, a communication standard such as Bluetooth (registered trademark) or Wi-Fi (registered trademark) is used. Further, the communication I/F 26 can communicate with an ECU different from ECU 21 provided in the diagnosis target vehicle 20 via an external bus.

Figure 4:
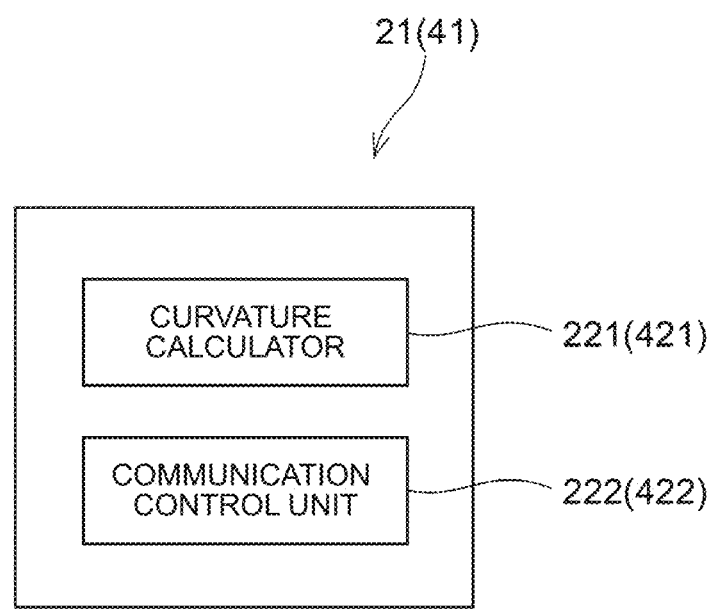
FIG. 4 is a functional diagram of an ECU.

As illustrated in FIG. 4, ECU 21 includes a curvature calculation unit 221 and a communication control unit 222 as a functional configuration. The curvature calculation unit 221 and the communication control unit 222 are realized by CPU 22 of ECU 21 reading out and executing a program stored in ROM 23.

The curvature calculation unit 221 calculates "the curvature Cv1 of the traveling locus of the diagnosis target vehicle 20=the yaw rate YR1÷the vehicle speed V1" based on the yaw rate YR1 detected by the yaw rate sensor 34 and the vehicle speed V1 detected by the vehicle speed sensor 30. Further, the curvature calculation unit 221 records the calculated curvature Cv1 in the storage 25 in association with ID information, the position information, and the time information of the diagnosis target vehicle 20.

The communication control unit 222 controls the communication I/F 26 so as to wirelessly transmit the vehicle speed V1, the steering angle ST1, the yaw rate YR1, and the curvature Cv1 recorded in the storage 25 and associated with the position information and the time information to the external servers 60 each time a predetermined period of time elapses.

The system 10 has one reference vehicle 40. The reference vehicle 40 can perform data communication with the external server 60 via a network.

As shown in FIG. 2, the reference vehicle 40 includes four wheels including two steered wheel (front wheel) 40FW, an ECU 41, a vehicle speed sensor 30, a steering wheel 31, a steering angle sensor 32, a GPS receiver 33, a yaw rate sensor 34, and an ignition switch 35. A vehicle ID is assigned to the reference vehicle 40. The vehicle speed sensor 30, the steering angle sensor 32, GPS receiver 33, the yaw rate sensor 34, and the ignition switch are connected to ECU 41. When the steering angle of the steering wheel 31 changes, the steered angle of the right and left steered wheels 40FW changes. The vehicle speed (vehicle information) V2 which is a detection value of the vehicle speed sensor 30, the steering angle (vehicle information) ST2 which is a detection value of the steering angle sensor 32, and the yaw rate (vehicle information) YR2 which is a detection value of the yaw rate sensor 34 are recorded in the storage 45 while being associated with ID information, the position information, and the time information of the reference vehicle 40.

As illustrated in FIG. 3, ECU 41 includes a CPU (processor) 42, a ROM 43, RAM 44, a storage 45, a communication I/F 46, and an input/output I/F 47. CPU 42, ROM 43, RAM 44, the storage 45, the communication I/F 46, and the input/output I/F 47 are communicably connected to each other via a bus 48. The specifications of CPU 42, ROM 43, RAM 44, the storage 45, the communication I/F 46, and the input/output I/F 47 are the same as those of CPU 22, ROM 23, RAM 24, the storage 25, the communication I/F 26, and the input-output I/F 27, respectively.

As illustrated in FIG. 4, ECU 41 includes a curvature calculation unit 421 and a communication control unit 422 as a functional configuration. The functions of the curvature calculation unit 421 and the communication control unit 422 are the same as those of the curvature calculation unit 221 and the communication control unit 222, respectively. The curvature calculation unit 421 and the communication control unit 422 are realized by CPU 42 of ECU 41 reading out and executing a program stored in ROM 43.

The curvature calculation unit 421 calculates "the curvature Cv2 of the traveling locus of the reference vehicle 40=the yaw rate YR2÷the vehicle speed V2" based on the yaw rate YR2 detected by the yaw rate sensor 34 of the reference vehicle 40 and the vehicle speed V2 detected by the vehicle speed sensor 30 of the reference vehicle 40. Further, the curvature calculation unit 421 records the calculated curvature Cv2 in the storage 45 in association with ID information, the position information, and the time information of the reference vehicles 40.

The communication control unit 422 controls the communication I/F 46 so as to wirelessly transmit the vehicle speed V2, the steering angle ST2, the yaw rate YR2, and the curvature Cv2 recorded in the storage 45 and associated with the position information and the time information to the external servers 60 each time a predetermined period of time elapses.

The external server 60 shown in FIG. 1 includes a CPU (processor), a ROM, a RAM, a storage, a communication I/F, and an input-output I/F as hardware configurations. The CPU, the ROM, the RAM, the storage, the communication I/F, and the input-output I/F are connected to each other so as to be able to communicate with each other via a bus. The CPU of the external server 60 can acquire information related to the time from the timer.

Figure 5:
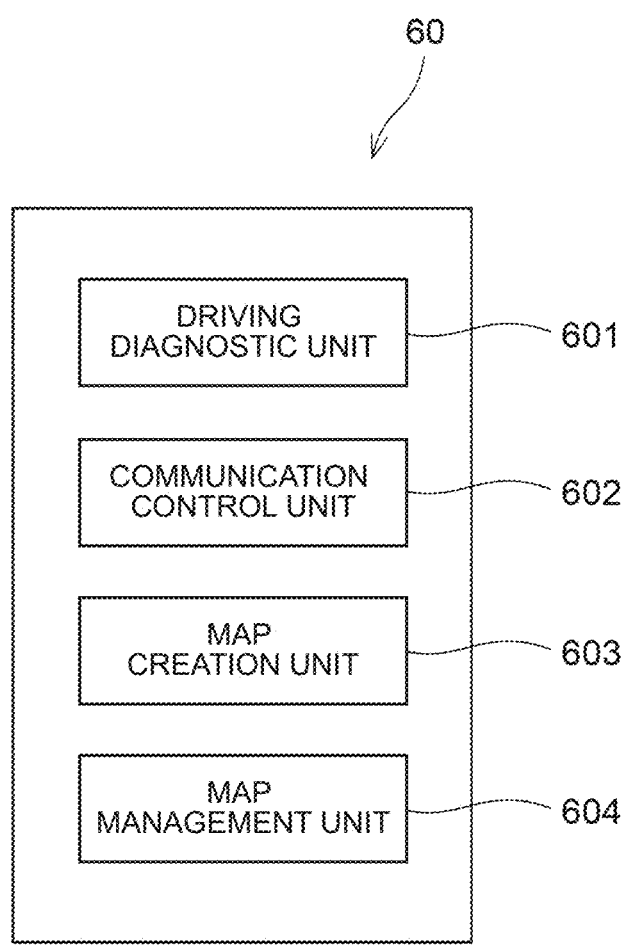
FIG. 5 is a functional block diagram of an external server of the driving diagnostic map creation system.

As illustrated in FIG. 5, the hardware of the external server 60 includes, as functional components, a driving diagnostic unit 601, a communication control unit 602, a map creation unit 603, and a map management unit 604. These functions are realized by CPU of the external servers 60 reading and executing the programs stored in ROM or the storage.

The driving diagnostic unit 601 calculates a steering angle acceleration STca1 that is an acceleration of the corrected steering angle Stc1 by performing second-order differentiation of the corrected steering angle Stc1 described later. Further, by applying the vehicle speed V1 and the steering angle acceleration STca1 to a steering diagnostic map 65 to be described later, the driving diagnostic unit 601 acquires scores related to the steering of the diagnosis target vehicle 20. Further, the driving diagnostic unit 601 records the obtained score in the storage of the external servers 60 while associating the obtained score with ID information, the position information, and the time information of the diagnosis target vehicle 20.

The steering diagnostic map 65 illustrated in FIG. 9 is recorded in ROM or the storage of the external servers 60. The steering diagnostic map 65 defines a vehicle speed V2 of the reference vehicle 40, a steering angular acceleration STa2 that is a second-order differential of the steering angle ST2, and a score related to steering. The vehicle speed V2 is a detection value of the vehicle speed sensor 30 of the reference vehicle 40. The steering angle ST2 is a detection value of the steering angle sensor 32 of the reference vehicle 40. The score is defined based on the behavior caused by the steering of the reference vehicle 40. That is, the steering diagnostic map 65 defines the relationship between the steering angular acceleration of the reference vehicle 40 and the behavior caused by the steering of the reference vehicle 40 for each vehicle speed. Accordingly, by applying the steering angular acceleration STa2 to the steering diagnostic map 65, a score representing the behavior caused by the steering of the reference vehicles 40 can be obtained.

The steering diagnostic map 65 defines the vehicle speed V2 in three regions. These three regions are a region of less than A (km/h), a region of A or more and less than B (km/h), and a region of B or more. The magnitude relationship is represented by B>A, and A and B are positive values. As shown in the steering diagnostic map 65, in the case where the vehicle speed V2 is less than A, the score when the steering angular acceleration STa2 is less than X1 is 10 points, and the score when the steering angular acceleration STa2 is X1 or more is 1 point. In the case where the vehicle speed V2 is A or more and less than B, the score when the steering angular acceleration STa2 is less than X2 is 10 points, and the score when the steering angular acceleration STa2 is X2 or more is 1 point. In the case where the vehicle speed V2 is B or more, the score when the steering angular acceleration STa2 is less than X3 is 10 points, and the score when the steering angular acceleration STa2 is X3 or more is 1 point. It should be noted that the magnitude relationship is represented by X1<X2<X3. X1, X2, and X3 are absolute values. By applying the vehicle speed V1 and the steering angle acceleration STca1 to the steering diagnostic map 65, the driving diagnostic unit 601 acquires scores related to the steering of the respective diagnosis target vehicles 20. For example, when the vehicle speed V1 is less than A and the steering angular acceleration STca1 is less than X1, the score is 10 points. The driving diagnostic unit 601 also records the acquired score in the storage of the external server 60 in association with the ID information of the diagnosis target vehicle 20, the position information, and the time information.

The communication control unit 602 controls the communication hF of the external server 60 so as to wirelessly transmit information related to the score of the diagnosis target vehicle 20, which is recorded in the storage and associated with the position information described above and the time information, to the mobile terminal 70 carried by an occupant of the diagnosis target vehicle 20 to which the score is given.

Figure 6:
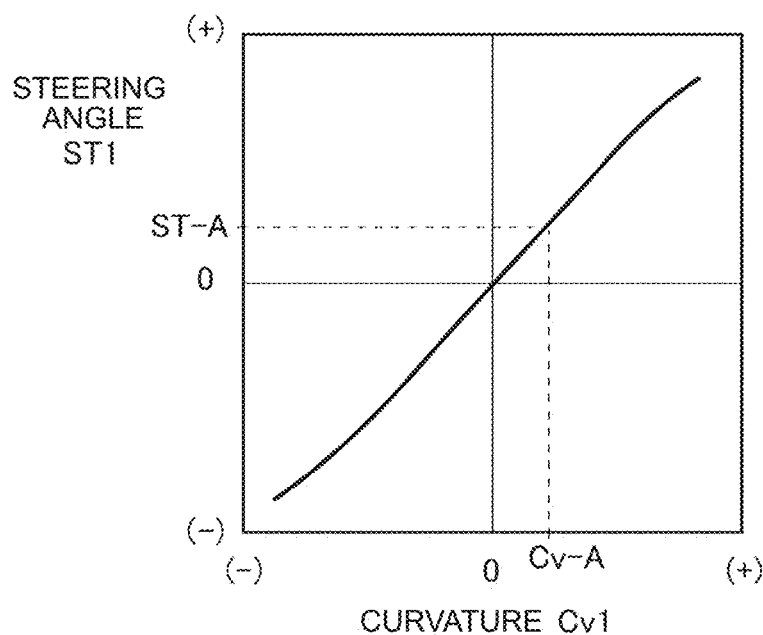
FIG. 6 is a diagram illustrating a first map recorded in an external server.

The map creation unit 603 creates the first map (driving diagnostic map) 75 illustrated in FIG. 6 based on the steering angle ST1 and the curvature Cv1 received from the respective diagnosis target vehicles 20. The vertical axis of the first map 75 represents the steering angle ST1, and the horizontal axis represents the curvature Cv1. The sign of the steering angle ST1 when the steering wheel 31 is steered in the clockwise direction is + (plus), and the sign of the steering angle ST1 when the steering wheel 31 is steered in the counterclockwise direction is − (minus). Further, the sign of the curvature Cv1 when the diagnosis target vehicle 20 turns to the right is + (plus), and the sign of the curvature Cv1 when the diagnosis target vehicle 20 turns to the left is − (minus).

Figure 8:
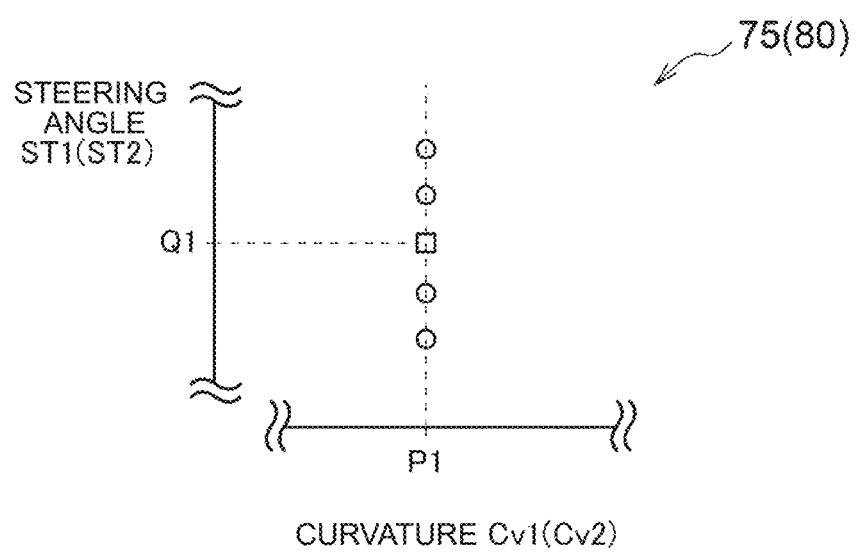
FIG. 8 is a diagram for describing a method of creating a first map and a second map.

The external server 60 receives a large amount of data representing the steering angle ST1 and the curvature Cv1 from each diagnosis target vehicle 20. The map creation unit 603 plots the received steering angle ST1 and curvature Cv1 on the first map 75. The map creation unit 603 then creates the first map 75 based on all the plotted data. At this time, the map creation unit 603 averages the data. That is, for example, as shown in FIG. 8, it is assumed that the steering angle ST1 corresponding to P1 which is a predetermined value of Cv1 of curvature includes four steering angle ST1 represented by o (circle). In this case, the map creation unit 603 regards the average value of the four steering angles ST1 represented by □ (square) as the value Q1 of the steering angle ST1 corresponding to P1. The first map 75 is created for each diagnosis target vehicle 20. That is, the same number of the first maps 75 as the number of the diagnosis target vehicles 20 are recorded in the storage, and ID data of each of the first maps 75 and each of the diagnosis target vehicles 20 are associated with each other. Furthermore, it is known that the steering angle of the vehicle and the curvature of the travel trajectory are substantially proportional to each other. Therefore, the graph indicated by the first map 75 is substantially linear.

Figure 7:
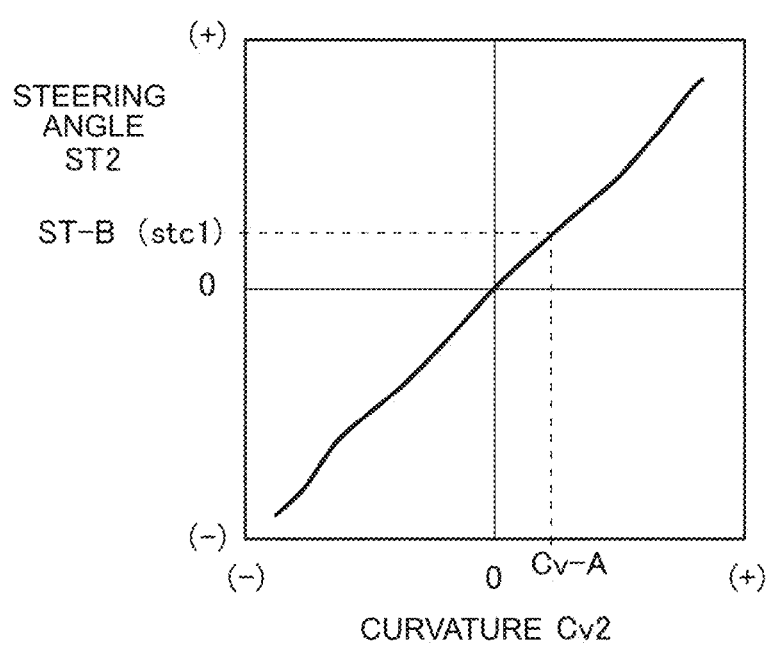
FIG. 7 is a diagram illustrating a second map recorded in an external server.

Furthermore, the map creation unit 603 creates the second map (driving diagnostic map) 80 illustrated in FIG. 7 based on a large amount of data representing the steering angle ST2 and Cv2 of curvature received from the reference vehicle 40 in the same manner.

Generally, the detection accuracy of the yaw rate sensor 34 is not high. However, the first map 75 and the second map 80 created in this way more accurately represents the relationship between the steering angle and the curvature of the diagnosis target vehicle 20 and the reference vehicle 40 as compared with the first map 75 and the second map 80 created not based on the average value. Therefore, the reliability of the first map 75 and the second map 80 created in this way is high.

A method of creating the first map 75 and the second map 80 executed by the map creation unit 603 will be described in detail later.

The map management unit 604 discards the first map 75 recorded in the storage when a discard condition described later with respect to the first map 75 is satisfied. Similarly, when the discard condition is satisfied with respect to the second map 80, the map management unit 604 discards the second map 80 recorded in the storage.

The mobile terminal 70 shown in FIG. 1 includes a CPU, a ROM, a RAM, a storage, a communication I/F, and an input-output I/F as hardware configurations. The mobile terminal 70 is, for example, a smartphone or a tablet computer. The CPU, the ROM, the RAM, the storage, the communication I/F, and the input-output I/F of the mobile terminal are connected to each other so as to be able to communicate with each other via a bus. The communication I/F of the mobile terminal 70 can wirelessly communicate with the communication I/F of the external server 60. The mobile terminal 70 can acquire information related to the date and time from a timer (not shown). The mobile terminal 70 is provided with a display 71 having a touch panel. Further, map data is recorded in the storage of the mobile terminal 70. The mobile terminal 70 is carried by, for example, the driver of the diagnosis target vehicle 20. A predetermined driving diagnosis display application is installed on the mobile terminal 70.

Action and Effect

Next, the operation and effects of the present embodiment will be described.

First, the flow of processes performed by ECU 21 of the respective diagnosis target vehicles 20 and ECU 41 of the reference vehicles 40 will be described with reference to the flow chart of FIG. 10. ECU 21, ECU 41 repeatedly executes the process of the flow chart of FIG. 10 every time a predetermined period elapses.

First, in S10 (step 10), the curvature calculation units 221 and 421 of ECU 21, ECU 41 calculate the curvature Cv1, Cv2 based on the yaw rate YR1, YR2 detected by the yaw rate sensor 34 and the vehicle speed V1, V2 detected by the vehicle speed sensor 30.

In ECU 21, ECU 41 where S10 has been processed, the process proceeds to S11. In S11, the communication control unit 222 of ECU 21 controls the communication I/F 26 so as to wirelessly transmit the vehicle speed V1, the steering angle ST1, the yaw rate YR1, and the curvature Cv1 associated with ID information, the position information, and the time information to the external servers 60. In S11, the communication control unit 422 of ECU 41 controls the communication I/F 46 so as to wirelessly transmit the vehicle speed V2, the steering angle ST2, the yaw rate YR2, and the curvature Cv2 associated with ID information, the position information, and the time information to the external servers 60.

Figure 10:
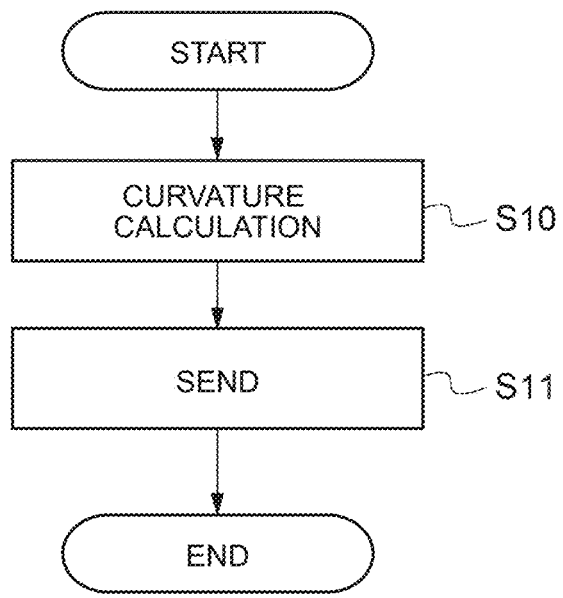
FIG. 10 is a flow chart illustrating a process executed by ECU of the vehicle to be diagnosed and the reference vehicle.

When S11 process is completed, ECU 21, ECU 41 temporarily ends the process of the flow chart of FIG. 10.

Next, the flow of processing performed by the external server 60 will be described with reference to the flowcharts of FIG. 11 and FIG. 12. Each time the predetermined time elapses, the external server 60 repeatedly executes the processing of the flowcharts in FIG. 11 and FIG. 12. First, the processing of the flowchart of FIG. 11 will be described.

First, in S20, the communication control unit 602 of the external server 60 determines whether the communication I/F has received the vehicle speed V1, the steering angle ST1, the yaw rate YR1, and the curvature Cv1 from the diagnosis target vehicle 20.

Subsequently, the external servers 60 proceed to S21. The external servers 60 calculate the corrected steering angle Stc1 of the diagnosis target vehicles 20 using the first map 75 and the second map 80 recorded in the storage. More specifically, the driving diagnostic unit 601 acquires Cv1 of curvature corresponding to the steering angle ST1 by applying the steering angle ST1 of the diagnosis target vehicle 20 to the first map 75 as an argument. At this time, the driving diagnostic unit 601 executes interpolation processing of the first map 75 as necessary. For example, it is assumed that the magnitude of the steering angle ST1 is the steering angle ST-A shown in FIG. 6. The magnitude of the curvature Cv1 acquired by applying the steering angle ST-A to the first map 75 as an argument is the curvature Cv-A. Further, by applying the curvature Cv-A to the second map 80 as an argument, the driving diagnostic unit 601 acquires the steering angle ST-B which is the steering angle ST2 of the reference vehicles 40 corresponding to the curvature Cv-A. At this time, the driving diagnostic unit 601 executes interpolation processing of the second map 80 as necessary. The steering angle ST-B is the corrected steering angle Stc1 of the diagnosis target vehicle 20. As will be described later, the first map 75 and the second map 80 recorded in the storage may be replaced with new maps. That is, the first map 75 is replaced with a new map when the vehicle characteristics of the diagnosis target vehicle 20 greatly change due to, for example, a collision, and the second map 80 is replaced with a new map when the vehicle characteristics of the reference vehicle 40 greatly change.

After S21, the external servers 60 proceed to S22. The driving diagnostic unit 601 calculates a steering angular acceleration STca1 which is an acceleration of the corrected steering angle Stc1. Further, by applying the vehicle speed V1 and the steering angle acceleration STca1 to the steering diagnostic map 65, the driving diagnostic unit 601 acquires scores related to the steering of the diagnosis target vehicle 20. The driving diagnostic unit 601 also records the acquired score in the storage of the external server 60 in association with the ID information of the diagnosis target vehicle 20, the position information, and the time information.

After S22, the external servers 60 proceed to S23. In S23, the communication control unit 602 of the external server 60 controls the communication hF 46 so as to wirelessly transmit the information on the scores recorded in the storage and associated with ID information, the position information, and the time information to the mobile terminal 70.

Figure 11:
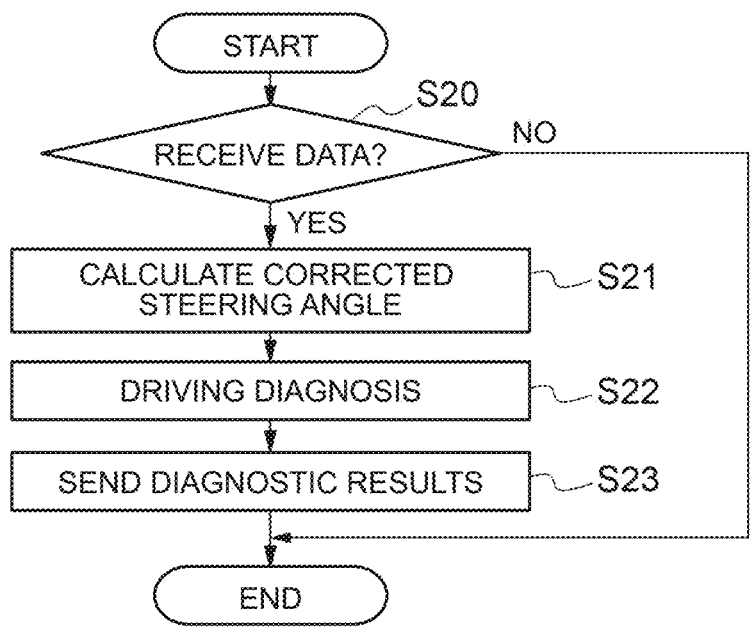
FIG. 11 is a flowchart illustrating a process executed by an external server.

When it is determined that S20 is No or when S23 process is completed, the external server 60 temporarily ends the process of the flow chart of FIG. 11.

Next, the processing of the flowchart of FIG. 12 will be described. More specifically, a process in which the map creation unit 603 creates the first map 75 corresponding to the specific diagnosis target vehicle 20 based on the steering angle ST1 and the curvature Cv1 received from the specific diagnosis target vehicle 20 that is a predetermined single diagnosis target vehicle 20 will be described.

First, in S30, the map creation unit 603 determines whether or not the external servers 60 have received the steering angle ST1 and the curvature Cv1 from the specified diagnosis target vehicles 20. In the following explanation, the steering angle ST1 and the curvature Cv1 newly received by the external servers 60 from the particular diagnosis target vehicles 20 are referred to as "latest detected values".

When determining Yes in S30, the map creation unit 603 determines in S31 whether or not the first map 75, which is a driving diagnostic map, is recorded in the storage. In other words, the map creation unit 603 determines whether or not the first map 75 that can be used for S21 process is stored.

If it is determined in S31 that it is No, the map creation unit 603 proceeds to S32. The map creation unit 603 newly creates the first map 75 based on the latest detection value recorded in the storage, and records the created first map 75 in the storage. If S31 is determined to be No, the external servers 60 receive enough steering angle ST1 and curvature Cv1 to create the first map 75 from the specified diagnosis target vehicles 20 and store them in the storage. In other words, the first map 75 in this case satisfies the learning completion requirement described later.

On the other hand, when it is determined that S31 is Yes, the map creation unit 603 proceeds to S33. Based on the first map 75 and the latest detection value recorded in the storage, the map creation unit 603 determines whether or not the difference between the first map 75 and the latest detection value is equal to or greater than a predetermined amount. That is, the map creation unit 603 determines whether or not the amount of change in the vehicle characteristic of the specific diagnosis target vehicle 20 between the first time when the latest detection value is received from the specific diagnosis target vehicle 20 and the second time when the newest data among the steering angle ST1 and Cv1 of curvature older than the latest detection value is received is larger than a predetermined amount. For example, in a case where the specific diagnosis target vehicle 20 collides with another vehicle between the second time and the first time, and thereby the vehicle characteristics of the specific diagnosis target vehicle 20 greatly change, the amount of change in the vehicle characteristics of the specific diagnosis target vehicle 20 becomes larger than the predetermined amount.

That is, the first map 75 recorded in the storage does not accurately represent the relation between the steering angle ST1 and Cv1 of curvature of the specified diagnosis target vehicle 20.

If it is determined in S33 that it is No, the map creation unit 603 proceeds to S34. The map creation unit 603 determines whether or not a pending map (not shown) to be described later is recorded in the storage.

When it is determined that S34 is Yes, the map creation unit 603 integrates the latest detected data into the first map 75 in S35. Then, the map creation unit 603 updates the first map 75 recorded in the storage. Furthermore, the map creation unit 603 discards (deletes) the pending map from the storage in S35.

When it is determined that S34 is No, the map creation unit 603 integrates the latest detected data into the first map 75 in S36. Then, the map creation unit 603 updates the first map 75 recorded in the storage.

On the other hand, if S33 is determined to be Yes, the map creation unit 603 proceeds to S37. The map creation unit 603 determines whether or not a pending map related to the specific diagnosis target vehicle 20 is recorded in the storage. When it is determined in S33 that it is Yes, the switching condition is satisfied with respect to the first map 75 and the latest detected value.

If No is determined in S37, the map creation unit 603 proceeds to S38 to create a pending map. The pending map is a map that represents the relation between the steering angle ST1 and Cv1 of curvature, which is created by the map creation unit 603, based on the latest detected value in which the switching condition is satisfied.

Subsequently, the map creation unit 603 proceeds to S39, and determines whether or not a predetermined training completion requirement is satisfied with respect to the pending map. That is, it is determined whether or not the steering angle ST1 and the curvature Cv1, which are the basis of the pending map, are sufficiently large. The pending map created based on this data accurately represents the relation between the steering angle ST1 and Cv1 of curvature when the data amounts of the steering angle ST1 and Cv1 of curvature are satisfactory. On the other hand, it is highly likely that the pending map created based on this data does not accurately represent the relation between the steering angle ST1 and Cv1 of curvature when the quantity of data of the steering angle ST1 and the curvature Cv1 is insufficient. When the external server 60 continuously performs the process of the flowchart of FIG. 12 a plurality of times and determines that it is No continuously a plurality of times in S37, a pending map is created based on the latest detected values of a plurality of times. That is, in this case, the pending map recorded in the storage is updated.

When Yes is determined in S39, the discard criterion is satisfied with respect to the first map 75 and the latest detected value. That is, when the switching condition is satisfied and the learning completion requirement is satisfied with respect to the pending map, the discard condition is satisfied with respect to the first map 75 and the latest detection value. In this case, the map management unit 604 discards the old first map 75 recorded in the storage and records the pending map as a new first map 75 in the storage in S40. That is, the old first map 75 recorded in the storage is replaced with the new first map 75.

On the other hand, if it is determined in S39 that it is No, the map creation unit 603 proceeds to S41 to keep the first map 75 recorded in the storage as it is, and to record the pending map in the storage.

On the other hand, when it is determined that the determination is impossible (IP) in S33, the map creation unit 603 proceeds to S42. For example, when the number of the curvature Cv1 corresponding to the first map 75 and the latest detected value is 10 or less, the map creation unit 603 determines that determination is impossible in S33.

When it is determined that S42 is No, the map creation unit 603 executes S36 process.

On the other hand, when it is determined that S42 or S37 is Yes, the map creation unit 603 proceeds to S43. The map creation unit 603 integrates the latest detection value into the pending map, and updates the pending map recorded in the storage.

Subsequently, the map creation unit 603 proceeds to S44, and determines the amount of deviation between the first map 75 and the pending map based on the first map and the pending map recorded in the storage.

When it is determined that S44 is Yes, the map creation unit 603 executes the same process as S39 in S45. That is, the map creation unit 603 determines whether or not the difference between the first map 75 and the pending map is equal to or greater than a predetermined amount based on the first map 75 and the pending map recorded in the storage.

When S45 is determined to be Yes, the discard criterion is satisfied. When the discard condition is satisfied, it is considered that there is a large difference between the characteristic representing the relation between the steering angle ST1 and Cv1 of curvature of the diagnosis target vehicle 20 represented by the first map 75 recorded in the storage and the characteristic represented by the pending map. When the discard condition is satisfied, the map management unit 604 executes the same process as S40 in S46. On the other hand, when it is determined that S45 is No, the map creation unit 603 executes the same process as S41 in S47.

When it is determined that S44 is No, the map creation unit 603 integrates the pending map into the first map 75 in S48, and updates the first map 75 recorded in the storage. Furthermore, the map creation unit 603 discards (deletes) the pending map from the storage.

Figure 12:
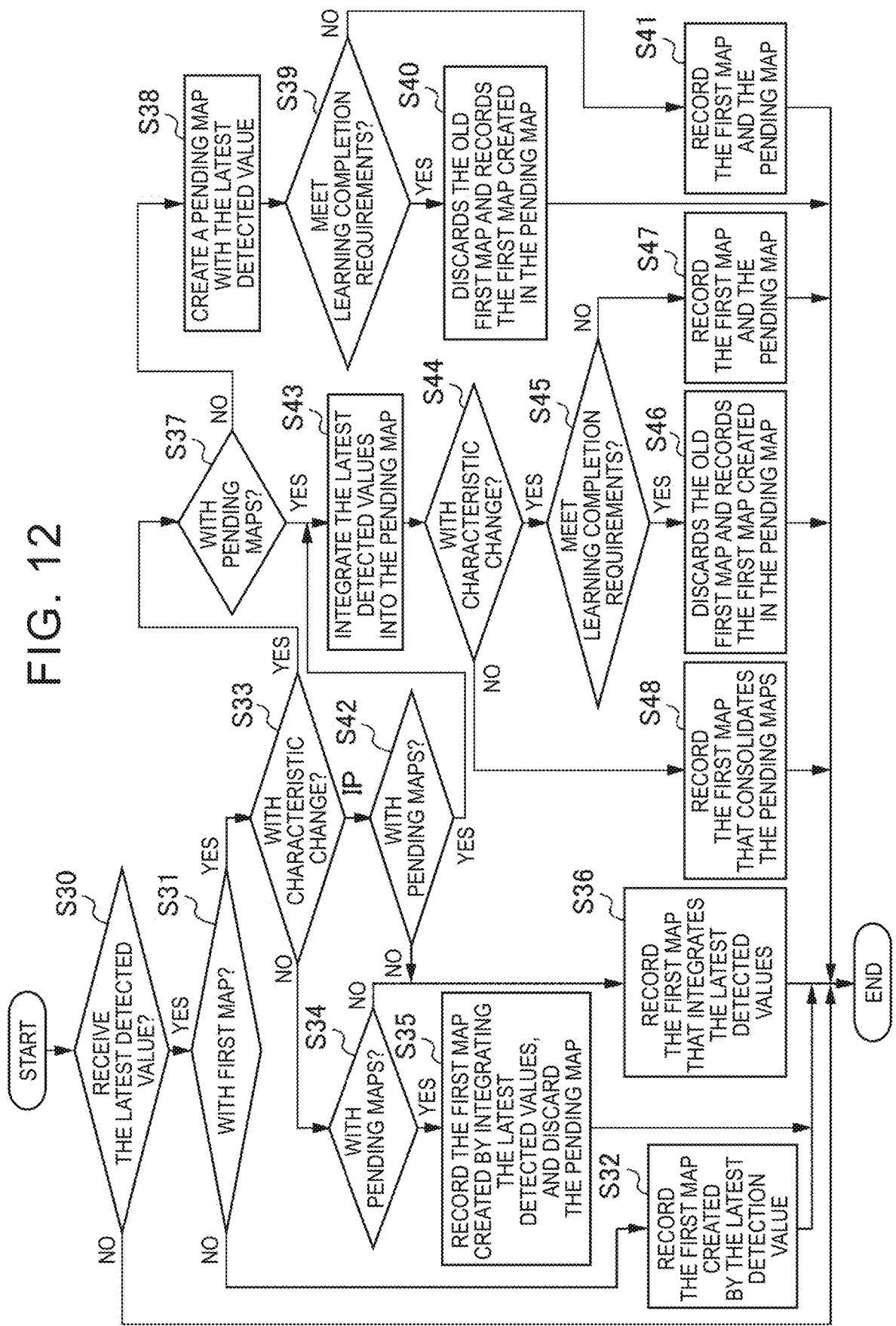
FIG. 12 is a flowchart illustrating a process executed by an external server.

When it is determined that S30 is No or when S32, S35, S36, S40, S41, S46, S47, S48 process is completed, the external server 60 temporarily ends the process of the flow chart of FIG. 12.

Further, the external server 60 executes the processing of the flowchart of FIG. 12 for the diagnosis target vehicle 20 other than the specific diagnosis target vehicle 20.

Further, the external server 60 executes the processing of the flowchart of FIG. 12 with respect to the reference vehicle 40. That is, the external servers 60 generate (update) the second map 80 based on the steering angle ST2 and the curvature Cv2 received from the reference vehicles 40. Here, the steering angle ST2 and the curvature Cv2 newly received by the external servers 60 from the reference vehicles 40 are "latest detected values".

Next, a flow of processing performed by the mobile terminal 70 will be described with reference to the flowchart of FIG. 13. Each time a predetermined time elapses, the mobile terminal 70 repeatedly executes the processing of the flowchart of FIG. 13. First, in S50, CPU of the mobile terminal 70 determines whether or not the driving diagnostic displaying application is being started.

The mobile terminal 70 determined to be Yes in S50 proceeds to S51, and determines whether the communication I/F of the mobile terminal 70 has received, from the communication I/F of the external server 60, the score data regarding the diagnosis target vehicle 20 on which the owner of the mobile terminal 70 rides.

The mobile terminal 70 that has determined Yes in S51 proceeds to S52. CPU displays images (not shown) representing the scores on the display 71. At this time, the display 71 may display a map image represented by the map data recorded in the storage of the mobile terminal 70, and may display the position where the steering operation corresponding to the score was performed as a specific image superimposed on the map image. Further, the display 71 may display information indicating the time when the steering operation corresponding to the score was performed in association with the score.

Figure 13:
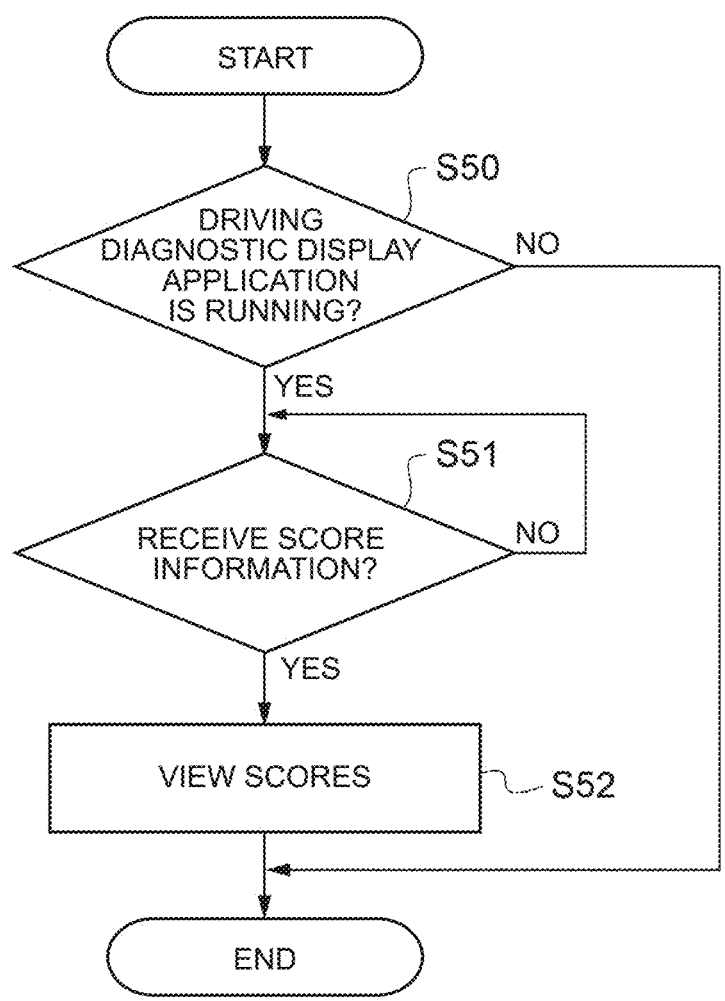
FIG. 13 is a flowchart illustrating a process executed by the mobile terminal.

When it is determined that S50 is No or when S52 process is completed, the mobile terminal 70 temporarily ends the process of the flow chart of FIG. 13.

As described above, in the present embodiment, the old first map 75 recorded in the storage of the external server 60 is discarded when the discard condition is satisfied with respect to the first map 75 due to a large change in the vehicle characteristics of the diagnosis target vehicle 20 due to a collision or the like. Similarly, when the discard condition is satisfied with respect to the second map 80 due to a large change in the vehicle characteristics of the reference vehicle 40 due to a collision or the like, the old second map 80 recorded in the storage of the external server 60 is discarded. Therefore, after the vehicle characteristics of at least one of the diagnosis target vehicle 20 and the reference vehicle 40 have greatly changed, the external server 60 continues to use the map regarding the vehicle whose vehicle characteristics have changed, so that there is little possibility that the external server 60 will continue to execute the incorrect driving diagnosis. Therefore, even when the vehicle characteristics of at least one of the diagnosis target vehicle 20 and the reference vehicle 40 greatly change, the external server 60 can execute the accurate driving diagnosis.

Furthermore, the pending map for the diagnosis target vehicle 20 is created based on the latest detection value in which the switching condition is satisfied. Therefore, it is highly likely that the pending map accurately represents the vehicle characteristics of the diagnosis target vehicle 20 when the latest detection value in which the switching condition is satisfied is detected. Similarly, the pending map for the reference vehicle 40 is likely to accurately represent the vehicle characteristics of the reference vehicle 40 when the latest detected value that satisfies the switching condition is detected. Therefore, when the learning completion requirement is satisfied, if the map creation unit 603 uses the pending map related to the diagnosis target vehicle 20 as the first map 75 and uses the pending map related to the reference vehicle 40 as the second map 80, there is a high possibility that an accurate driving diagnosis is executed.

Further, the discard condition is satisfied when the pending map related to the diagnosis target vehicle 20 becomes available as the first map 75, and the discard condition is satisfied when the pending map related to the reference vehicle 40 becomes available as the second map 80. Therefore, when the old first map 75 is discarded, the driving diagnosis is executed based on the new first map 75, and when the old second map 80 is discarded, the driving diagnosis is executed based on the new second map 80. Further, even when a large change occurs in the vehicle characteristics of the diagnosis target vehicle 20, the driving diagnosis is executed based on the old first map 75 recorded in the storage of the external server 60 until a new first map 75 is created. Similarly, even when a large change occurs in the vehicle characteristics of the reference vehicle 40, the driving diagnosis is executed based on the old second map 80 recorded in the storage of the external server 60 until a new second map 80 is created. Therefore, the external server 60 can execute the driving diagnosis of the diagnosis target vehicle 20 until the new first map 75 and the second map 80 based on the pending map are created.

Further, in the present embodiment, Cv1 of curvature of the travel locus of the diagnosis target vehicle 20 is obtained based on the yaw rate YR1 and the vehicle speed V1 of the diagnosis target vehicle 20. Further, based on the steering diagnostic map 65 and the steering angle acceleration STca1, a driving diagnosis related to the steering of the diagnosis target vehicle 20 is performed. As described above, the steering diagnostic map 65 defines the relationship between the steering angular acceleration of the reference vehicle 40 and the behavior of the reference vehicle 40. That is, the steering diagnostic map 65 does not define the relation between the steering angular acceleration STca1 of the diagnosis target vehicle 20 and the behavior of the diagnosis target vehicle 20. However, it is known that the relationship between the curvature of the traveling locus and the behavior caused by the steering of the vehicle is substantially the same regardless of the vehicle type (specification) of the vehicle. Further, as described above, it is known that the steering angle of the vehicle and the curvature of the travel trajectory are substantially proportional to each other. That is, it is known that there is a correlation between the steering angle and the curvature. Accordingly, the score obtained by applying the steering angular acceleration STa1 that is a value based on the curvature Cv1 of the diagnosis target vehicle 20 to the steering diagnostic map 65 represents the behavior caused by the steering of the diagnosis target vehicle 20. Therefore, the driving diagnosis related to the steering of the diagnosis target vehicle 20 can be executed on the basis of the steering diagnostic map 65 and the steering angular acceleration STca1 of the diagnosis target vehicle 20. Further, by applying the steering angular acceleration STa2 to the steering diagnostic map 65, it is possible to execute the driving diagnosis related to the steering of the reference vehicle 40. That is, it is possible to execute the driving diagnosis related to the steering of the reference vehicle 40 and the diagnosis target vehicle 20 based on one criterion.

Although the system 10, the driving diagnostic map creation device, the driving diagnostic map creation method, and the program according to the embodiment have been described above, these can be appropriately changed in design without departing from the gist of the present disclosure.

For example, the external server 60 may create a map different from the first map 75 based on the detection value of the sensor of the diagnosis target vehicle 20, and may create a map different from the second map 80 based on the detection value of the sensor of the reference vehicle 40. For example, at least one of the arguments of these maps is different from the steering angle and curvature.

Further, each vehicle may have a function corresponding to the map creation unit 603 and the map management unit 604. For example, ECU 21 of the diagnosis target vehicles 20 may have a function corresponding to the map creation unit 603 and the map management unit 604, and ECU 21 may create the first map 75. Further, ECU 41 of the reference vehicles 40 may have functions corresponding to the map creation unit 603 and the map management unit 604, and ECU 41 may create the second map 80. In this case, the first map 75 created by the diagnosis target vehicle 20 may be transmitted to the external server the second map 80 created by the reference vehicle 40 may be transmitted to the external server 60, and the driving diagnosis of the diagnosis target vehicle 20 may be performed using the first map 75 and the second map 80 received by the external server 60. Further, in this case, the reference vehicle 40 may wirelessly transmit the second map 80 created by the reference vehicle 40 to the diagnosis target vehicle 20, and ECU 21 of the diagnosis target vehicle 20 may execute the driving diagnosis of the diagnosis target vehicle 20 using the first map 75 and the second map 80. In this case, the external server 60 can be omitted from the system 10.

The second map 80 may be created in advance based on a large amount of data representing the steering angle ST2 and Cv2 of curvature of the reference vehicle 40, and the second map 80 may be recorded in ROM or the storage of the external servers 60. This second map 80 is not updated. Further, the second map 80 may be created by the external server 60, or may be created by a computing device (computer) different from the external server 60 and then recorded in ROM or the storage of the external server 60.

The system 10 may not be connected to the Internet. In this case, for example, the detection value data group acquired from the diagnosis target vehicle 20 and the reference vehicle 40 is recorded on a portable recording medium (for example, a universal serial bus (USB)), and the detection value data group in the recording medium is copied and stored in the storage of the external server 60.

The external server 60 may wirelessly transmit the diagnosis result to the diagnosis target vehicle 20, and a display (not shown) provided in the diagnosis target vehicle may display the diagnosis result.

APPENDICES

The driving diagnostic map creation device according to the present disclosure may be a combination of any of the following configurations 1 to 4. Further, the driving diagnostic map creation system, the driving diagnostic map creation method, and the program according to the present disclosure may correspond to a combination of any of the configurations 1 to 4.

<Configuration 1> The driving diagnostic map creation device that includes a map creation unit that creates a driving diagnostic map used for driving diagnosis of a vehicle by a driving diagnostic unit based on a detection value of vehicle information acquired by a sensor provided in the vehicle, and a map management unit that discards the driving diagnostic map when a discarding condition is satisfied for a latest detection value that is the detection value acquired most recently and the driving diagnostic map created by the map creation unit based on the detection value acquired before the latest detection value.

<Configuration 2> The driving diagnostic map creation device in which the map creation unit creates, based on the latest detection value for which the switching condition is satisfied, a pending map that is able to be used by the driving diagnostic unit as a new driving diagnostic map when a predetermined learning completion requirement is satisfied, when a switching condition that is satisfied when a difference between the driving diagnostic map and the latest detection value becomes equal to or larger than a predetermined amount is satisfied for the driving diagnostic map and the latest detection value.

<Configuration 3> The driving diagnostic map creation device in which the discarding condition is satisfied when the pending map satisfies the learning completion requirement.

<Configuration 4> The driving diagnostic map creation device in which the driving diagnostic unit executes driving diagnosis using the existing driving diagnostic map until the pending map satisfies the learning completion requirement.

What is claimed is:

1. A driving diagnostic map creation device, comprising:
a map creation unit that creates a driving diagnostic map used for driving diagnosis of a vehicle by a driving diagnostic unit based on a detection value of vehicle information acquired by a sensor provided in the vehicle; and
a map management unit that discards the driving diagnostic map when a discarding condition is satisfied for a latest detection value that is the detection value acquired most recently and the driving diagnostic map created by the map creation unit based on the detection value acquired before the latest detection value, wherein
when a switching condition that is satisfied when a difference between the driving diagnostic map and the latest detection value becomes equal to or larger than a predetermined amount is satisfied for the driving diagnostic map and the latest detection value, the map creation unit creates, based on the latest detection value for which the switching condition is satisfied, a pending map that is able to be used by the driving diagnostic unit as a new driving diagnostic map when a predetermined learning completion requirement is satisfied.

2. The driving diagnostic map creation device according to claim 1, wherein
the discarding condition is satisfied when the pending map satisfies the learning completion requirement.

3. The driving diagnostic map creation device according to claim 2, wherein
the driving diagnostic unit executes driving diagnosis using the existing driving diagnostic map until the pending map satisfies the learning completion requirement.

4. A driving diagnostic map creation system, comprising:
a vehicle including a sensor that is able to detect vehicle information;
a map creation unit that creates a driving diagnostic map used for driving diagnosis of the vehicle by a driving diagnostic unit based on a detection value of the vehicle information acquired by the sensor; and
a map management unit that discards the driving diagnostic map when a discarding condition is satisfied for a latest detection value that is the detection value acquired most recently and the driving diagnostic map created by the map creation unit based on the detection value acquired before the latest detection value, wherein
when a switching condition that is satisfied when a difference between the driving diagnostic map and the latest detection value becomes equal to or larger than a predetermined amount is satisfied for the driving diagnostic map and the latest detection value, the map creation unit creates, based on the latest detection value for which the switching condition is satisfied, a pending map that is able to be used by the driving diagnostic unit as a new driving diagnostic map when a predetermined learning completion requirement is satisfied.

* * * * *